United States Patent
Wang

(10) Patent No.: US 9,053,044 B2
(45) Date of Patent: Jun. 9, 2015

(54) METHOD FOR DISPLAYING DYNAMIC CONTENTS THROUGH USB STORAGE MEDIA

(71) Applicant: MCCI Corporation, Ithaca, NY (US)

(72) Inventor: Chun-Yi Wang, Taipei (TW)

(73) Assignee: MCCI Corporation, Ithaca, NY (US)

( * ) Notice: Subject to any disclaimer, the term of this patent is extended or adjusted under 35 U.S.C. 154(b) by 78 days.

(21) Appl. No.: 13/715,171

(22) Filed: Dec. 14, 2012

(65) Prior Publication Data

US 2013/0191564 A1    Jul. 25, 2013

Related U.S. Application Data

(60) Provisional application No. 61/570,456, filed on Dec. 14, 2011.

(51) Int. Cl.
*G06F 3/00*     (2006.01)
*G06F 15/167*   (2006.01)
*G06F 13/10*    (2006.01)

(52) U.S. Cl.
CPC ....................................... *G06F 13/10* (2013.01)

(58) Field of Classification Search
None
See application file for complete search history.

(56) References Cited

U.S. PATENT DOCUMENTS

2013/0007729 A1* 1/2013 Sirotkin ............................ 718/1
2014/0095726 A1* 4/2014 Fok et al. ...................... 709/228

OTHER PUBLICATIONS

Compaq, Hewlett-Packard, Intel, Lucent, Microsoft, NEC, Philips, Chapter 5 of Universal Serial Bus Specification, Revision 2.0, Apr. 27, 2000 (74 Pages).
Universal Serial Bus Device Class Definition for Video Devices, Revision 1.5, Aug. 9, 2012 (184 Pages).
Universal Serial Bus Device Class Definition for Video Media Transport Terminal, Revision 1.5, Aug. 9, 2012 (30 Pages).
Universal Serial Bus Device Class Definition for Video Devices: Version 1.5 Examples, Revision 1.5, Aug. 9, 2012 (32 Pages).
Universal Serial Bus Device Class Definition for Video Devices: H.264 Payload, Revision 1.5, Aug. 9, 2012 (45 Pages).
Universal Serial Bus Device Class Definition for Video Devices: Video Device Examples, Revision 1.5, Aug. 9, 2012 (54 Pages).

* cited by examiner

*Primary Examiner* — Chun-Kuan Lee
*Assistant Examiner* — Richard B Franklin
(74) *Attorney, Agent, or Firm* — Cesari and McKenna, LLP

(57) ABSTRACT

A presentation system includes a remote device with a dynamic storage subsystem that dynamically updates designated storage locations in actual or virtual memory with content for presentation at times associated with the presentation of the updated content by a presentation device. The presentation device, which is connected to the remote device by a data transport connection, accesses the content from the designated storage locations and presents the content as playback data.

20 Claims, 2 Drawing Sheets

METHOD FOR DISPLAYING DYNAMIC CONTENTS THROUGH USB STORAGE MEDIA

CROSS-REFERENCE TO RELATED APPLICATIONS

The present application claims the benefit of U.S. Provisional Patent Application Ser. No. 61/570,456, which was filed on Dec. 14, 2011, by Chung-Yi Wang for a SYSTEM AND METHOD FOR DISPLAYING DYNAMIC CONTENTS THROUGH STORAGE MEDIA and is hereby incorporated by reference.

BACKGROUND OF THE INVENTION

A local display device that includes a USB port operates as a USB host for pluggable USB drives, such as USB flash drives. The local display reads the data file or files stored on the USB drive, manipulates the data, as necessary, and displays the data. Accordingly, a USB drive can first be plugged into a USB port of a laptop, which operates as USB host to write data, such as videos or other content over the USB connection, to the USB drive. Thereafter, the USB drive is unplugged from the PC and plugged into the USB port of the local display device, such as a television, which acts as USB host storage function to read the video data or other content from the USB drive into local storage in accordance with the USB protocol. The display device then operates in a known manner to display the locally stored data. Similarly, other types of removable storage may by used in the same manner to provide static content to a local display device. The content may be, for example, MPEG video files. Removable storage may be used in the same way to provide data such as MP3 audio files, and so forth.

The local display or audio devices and the removeable storage devices work well together, with the local display device able to access and utilize the previously stored video, audio, or other data, that is, static content, stored on the removable storage device.

What is needed is a mechanism to provide dynamic content, such as remote desktops or streaming video, to the local display device.

SUMMARY OF THE INVENTION

A dynamic storage subsystem operates on a remote device that is operatively connected to a local presentation device such as a display and/or audio device and provides to the local device, through designated locations or buffers in actual or virtual memory of the connected device, dynamic content in the form of encoded data that can be displayed or otherwise presented or utilized by a playback function on the local device. The dynamic storage subsystem dynamically updates the encoded data contained in the designated storage locations, to provide new content for playback at the local device. The designated actual or virtual memory locations on the connected device are also regularly accessible to the local device, at appropriate times, to provide streaming or other dynamic content to the local device as new data formatted for a next playback operation or as part of a next phase of a media loop. The local device thus displays or otherwise utilizes the data that are accessible from the designated remote device memory locations, to provide the dynamic content to the user essentially as a seemingly continuous series of videos or other encoded playback data.

BRIEF DESCRIPTION OF THE DRAWINGS

The invention description below refers to the accompanying drawings, of which.

DETAILED DESCRIPTION OF AN ILLUSTRATIVE EMBODIMENT

The invention is described by example using a remote (storage) device connectable through a USB port to a local display device. The remote device may be a smart phone or other plug and play (PnP) device capable of internally providing encoded dynamic content to virtual or actual memory. The example discusses display data, however, the data may be any data that can be utilized by a playback function, such as, audio data. Further, the connection may be configured for any type of PnP device and is data transport connection, such as eSATA devices, NAS devices, and so forth.

Figure 1:
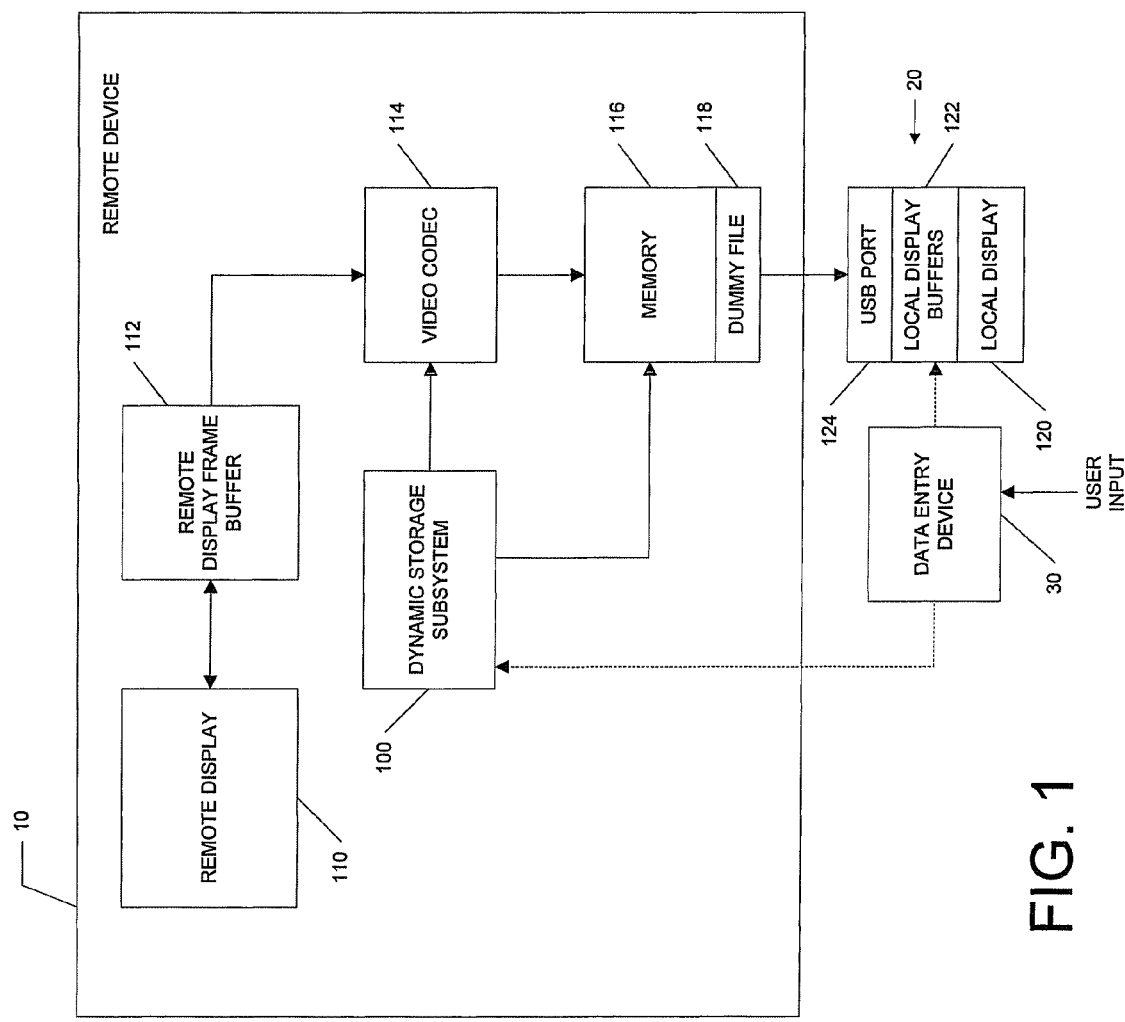
FIG. 1 is a functional block diagram of a system constructed in accordance with the invention.

Referring now to FIG. 1, a remote connectable device 10 with internal memory 116, such as, for example, a smart phone, includes a dynamic storage subsystem 100, which may consist of one or more device drivers, that operate to provide dynamic content to a local display device 20 through the internal memory 116 as regularly updated data accessible to a playback function on the local device 20. In the example, the remote device 10 is a smart phone and the desktop is displayed, essentially dynamically, on the display 120 of local device 20. The local device 20 may be, for example, a television and the remote device 10 is connected to the television through a USB port 124.

The dynamic storage subsystem 100 creates a dummy video file and stores the dummy file on the memory 116 in designated storage locations 118. The storage locations 118 are accessible also to a USB host storage function on the television 20 when the remote device 10 is plugged into the USB port 124 of the television. When the remote device is plugged in, the television accesses the dummy file via USB read requests to the designated storage locations 118 and presents to the user a video of the file contents. The user browses the file contents of the USB storage medium, sees the dummy file on the television screen, and selects "play" using an associated data entry device 30, such as a remote control device. Alternatively, the user may enter the command directly on the remote display device 10. The selection signal (shown in dotted lines in the drawing) prompts the dynamic storage subsystem 100 to control a video codec 114, which then encodes the contents of a display frame buffer 112 into a video file or a video chunk, as appropriate. In the example, the video codec 114 operates in a known manner to provide the data as an H.264 video chunk.

The dynamic storage subsystem 100 then writes the encoded video data to the designated storage locations 118 on the memory 116. The USB host function in the television 20 periodically accesses the contents of the designated storage locations 118 over the USB connection through read requests in accordance with the USB protocol, and the sub-system 100 provides the video chunk as USB formatted data to the USB host, which in turn provides the video chunk to local buffers 122 in the television. A playback function operating on the television manipulates and displays the data on the local display 120 in a known manner.

At the same time the video codec 114 encodes a next video chunk, and the dynamic storage subsystem 100 provides the encoded data to the designated storage locations 118 of the memory 116. The television 20 again accesses the storage locations 118 through a USB read operation and thereafter utilizes the new video chunk for display. The operations continue, in this manner, such that the encoded video data are made available at appropriate times to the television through USB read operations of the designated storage locations 118, in order to capture the dynamic content for local display.

The same operations can also be performed for video or audio data streaming to the remote display device 10, with the subsystem 100 controlling operations that encode the stream into the video or audio chunks or other files that may be played back, and providing the chunks or files to the designated storage location 118 of the memory 116. At the same time, the remote device 10 may also utilize the streaming data in a known manner for display on the display 110. The dynamic storage subsystem 100 thus directs is the codec 114 to provide the data in the appropriate format to the designated storage locations 118 of the memory 116 dynamically, and the encoded data are then also available to the USB host function of the television in response to read requests over the USB connection. Thus, the display data at the remote device 10 are available to the television 20 at essentially the same time, or with a 1 or 2 chunk delay through the codec 114 as appropriate for read/write timing constraints.

The USB host function on the television thus reads the properly encoded segments of the dynamic content from the buffers 118 on the memory 116 at designated times in accordance with the USB protocol as part of a USB read operation. The dynamic storage subsystem 110 may set a playback time within the data files, such that the television 20 returns to the designated storage locations 118 at intervals that correspond essentially to the play lengths of the video chunks. Alternatively, the dynamic storage subsystem 100 may establish a media loop with a loop time that corresponds essentially to the play lengths of video chunks. Accordingly, each time the USB host storage function returns to access the contents of the designated storage locations of the memory 116, the locations contain new video data that corresponds to the current, or a 1 or 2 chunk delay, dynamic content of the display frame buffer 112.

In the example, the USB host function of the local display device 20 accesses the encoded video data from the designated storage locations 118 of the memory 116 over the USB connection through the USB port 124 at the times appropriate for display on the local display 120, and operates in a known manner to provide the data to local display buffers 122 and then display the video data. The subsystem 100 dynamically updates the designated locations 118 of memory 116 with updated encoded video data between the USB host access times, and the USB host accesses the now updated data from the designated storage locations 118 at the appropriate times. For example, the subsystem 100 may write the encoded video data to a second half of a client buffer while the USB host function of the local display device 120 reads the data from a first half of the client buffer, and then write new video data to the first half of the client buffer while the USB host function of the local display device reads from the second half of the client buffer, and so forth. Alternatively, the designated storage locations may be written by the remote display device at a 1 or 2 chunk delay while the local device displays the previously accessed encoded data, without adversely affecting the user's viewing of the dynamic content.

Figure 2:
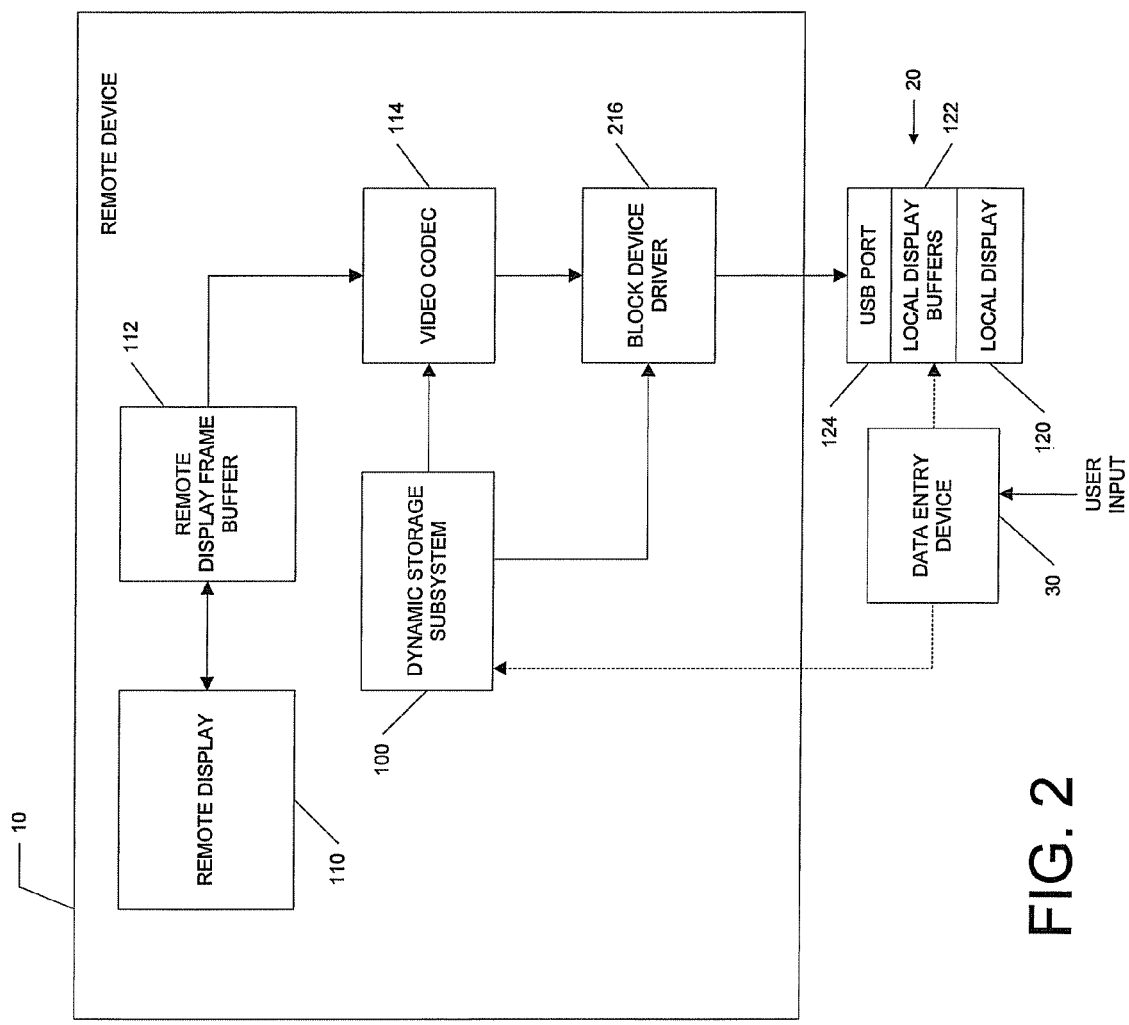
FIG. 2 is a functional block diagram of an alternative system constructed in accordance with the invention.

Referring now to FIG. 2, a dedicated or special purpose block device driver 216, which is included in the dynamic storage sub-system 100, provides a file allocation table (not shown) for use by the USB host to recognize virtual memory content, and also to locate the storage block that corresponds, in the example, to the desired video content. In response to a first read request, the sub-system 100 provides a dummy file, which may be virtual and thus created as needed or may be stored in an internal memory (not shown) that is accessible by the sub-system. Accordingly, the block device driver 216 uses the allocation table to provide, directly over the USB connection to the USB host in response to the read requests, first the dummy file and then the dynamic content in the form of codec encoded and USB formatted video chunks or files, as discussed below. Accordingly, the sub-system 100 avoids complexities associated with the control and timing of write and read operations to the designated locations 118 of the memory 116 is and also any associated delays, as described above with reference to FIG. 1, by satisfying the read requests from the USB host without having to store or even cache the processed data.

Once the user sees the dummy file content and selects "play" as discussed above, the USB host consults the allocation table and requests to read the block that corresponds to the desired video content. In response to the read request from the USB host, the sub-system 100 controls the video codec 114 to encode the contents of the remote display buffer 112 into a video chunk. The block device driver then formats the encoded data, that is, the video chunk, for transport over the USB and provides the data directly over the USB connection through the USB port 124 to the USB host in accordance with the USB protocol. The block device driver thus provides the processed dynamic content data directly over the USB connection to the USB host in response to the read request, without requiring intermediate storage or even caching of the processed data.

The USB host at the television utilizes the USB formatted video chunk data in a known manner, providing the encoded video chunk data to the local display buffers 122 and ultimately displaying the video chunk on the local display 120 using a playback function. The USB host at the television then consults the allocation table and sends additional read requests for the blocks containing the desired video content to the block device driver 216, and receives in return the dynamically updated contents of the display buffer as properly encoded and USB formatted video chunks from the driver. The television thus displays the dynamic content as a series of video chunks as discussed above, based on serial read operations to the designated blocks of virtual memory.

As also discussed, the connection between the remote device 10 and the television local device 20 may support data transport formats in addition to or other than the USB format, and the block device driver 216 is thus configured to provide the codec encoded data over the connection in the appropriate format for data transport, without requiring the storing or caching of the encoded and formatted data.

The local device may be, for example, a television that includes a USB port or other connection port for plug and play (PnP) remote storage devices, such as NAS or eSTATA devices, and the displayed data may be a remote desktop or streaming video provided by, for example, a smart phone or other remote display device that is capable of internally providing through actual or virtual memory data that are encoded for playback and formatted for transport over the connection. The memory may be virtual, volatile or non-volatile storage.

What is claimed is:

1. A presentation system comprising:
 a remote device including a dynamic storage subsystem that dynamically updates designated storage locations in a memory with content for presentation, the dynamic storage subsystem updating the designated storage locations at times associated with presentation of updated content by a presentation device; and the presentation device connected to the remote device by a data transport connection, the presentation device accessing the content from the designated storage locations and presenting the content as playback data, wherein the remote device includes and encoder that encodes data into respective chunks for presentation and provides the respective chunks as the contents to the designated storage locations.

2. The presentation system of claim 1 wherein the presentation device accesses the content from the designated storage locations at times that are associated with play lengths of the respective chunks.

3. The presentation system of claim 2 wherein
the remote device sets playback times within the respective chunks, and
the presentation device accesses the content at next playback times.

4. The presentation system of claim 2 wherein
the data transport connection includes a universal serial bus (USB),
the presentation device includes a USB host that accesses the content by sending read requests directed to the designated storage locations to the remote device; and
the remote device formats the content for transmission and transmits the formatted contents over the USB to the presentation device.

5. The presentation system of claim 2 wherein
the designated storage locations are blocks in an allocation table, and
the presentation device accesses the blocks by sending read requests designating one or more selected blocks.

6. The presentation system of claim 5 wherein
the remote device responds to the read requests by directing the encoder to encode data that corresponds to the one or more selected blocks into the respective chunks, and
the remote device further includes a block device driver that formats the respective chunks for transmission over the data transport connection and provides the formatted respective chunks to the presentation device in response to the read requests.

7. The presentation system of claim 6 wherein
the data transport connection is a universal serial bus (USB),
the presentation device includes a USB host that sends the read requests; and
the block device driver formats the contents for transmission and transmits the formatted content; over the USB to the presentation device in response to the read request.

8. The presentation system of claim 1 wherein the remote device is one of a NAS or an eSTATA device.

9. The presentation system of claim 1 wherein the presentation device is a display device that provides the presentation as a series of playback videos.

10. The presentation system of claim 1 wherein the presentation device is an audio device that provides the presentation as a series of audio playback data.

11. A method comprising:
at a remote device dynamically updating designated storage locations in memory with content for presentation at times associated with presentation of updated content including encoding data into respective files for presentation and providing the respective files to the designated storage locations as the content; and
at a presentation device accessing the content from the designated storage locations and presenting the content as playback data.

12. The method of claim 11 wherein accessing content from the designated storage locations includes accessing the content at times that correspond to play lengths of respective files.

13. The method of claim 12 wherein
encoding the data includes setting playback times within the respective files, and
accessing the content includes accessing the content at next playback times.

14. The method of claim 11 wherein
accessing the content includes sending read requests directed to the designated storage locations to the remote device, and
at the remote device formatting the content for transmission and transmitting the formatted content over a data transport connection to the presentation device.

15. The method claim 11 wherein the remote device is one of a NAS or an eSTATA device.

16. The method of claim 11 wherein the presentation device includes a smart phone.

17. A method comprising:
at a remote device dynamically updating designated storage locations in a memory with content for presentation at times associated with presentation of updated content; and
at a presentation device accessing the content from the designated storage locations and presenting the content as playback, wherein accessing the content includes sending read requests designating one or more selected blocks of an allocation table.

18. The method of claim 17 wherein the remote device responds to the read requests by
encoding data that corresponds to the one or more selected blocks into one or more chunks,
formatting the one or more chunks for transmission over a data transport connection, and
transmitting the one or more formatted chunks to the presentation device over the data transport connection.

19. The method of claim 18 wherein
the data transport connection is a universal serial bus (USB),
the presentation device includes a USB host that sends the read requests, and
the remote device includes a block device driver that formats the contents for transmission and transmits the formatted contents, over the USB to the presentation device in response to the read request.

20. The method of claim 17 wherein the presentation device includes a smart phone.

* * * * *

UNITED STATES PATENT AND TRADEMARK OFFICE
CERTIFICATE OF CORRECTION

| | | |
|---|---|---|
| PATENT NO. | : 9,053,044 B2 | Page 1 of 1 |
| APPLICATION NO. | : 13/715171 | |
| DATED | : June 9, 2015 | |
| INVENTOR(S) | : Chun-Yi Wang | |

It is certified that error appears in the above-identified patent and that said Letters Patent is hereby corrected as shown below:

In the Specification:

Col. 1, line 37 should read:
The local display or audio devices and the removable Col. 2, line 21 should read:
type of PnP device and data transport connection, such as Col. 3, line 17 should read:
dynamic storage subsystem 100 thus directs the codec 114

Col. 4, line 14 should read:
memory 116 and also any associated delays, as described In the Claims:

Claim 1, Col. 5, line 7 should read:
wherein the remote device includes an encoder that Claim 17, Col. 6, line 37 should read:
as playback data, wherein accessing the content includes Signed and Sealed this
Sixth Day of October, 2015

Michelle K. Lee
*Director of the United States Patent and Trademark Office*